US00RE33898E

United States Patent [19]

Santos

[11] E Patent Number: Re. 33,898

[45] Reissued Date of Patent: Apr. 28, 1992

[54] FREE FALL WINDLASS

[75] Inventor: Jose Santos, Shelton, Conn.

[73] Assignee: Campbell Hausfeld/Scott Fetzer Company, Harrison, Ohio

[21] Appl. No.: 670,348

[22] Filed: Mar. 15, 1991

Related U.S. Patent Documents

Reissue of:

[64] Patent No.: 4,809,633
Issued: Mar. 7, 1989
Appl. No.: 45,604
Filed: May 1, 1987

[51] Int. Cl.[5] ..... B63B 21/22

[52] U.S. Cl. ..... 114/210; 114/254; 254/345

[58] Field of Search ..... 114/210, 254; 74/321, 74/348, 421 A, 405; 254/345; 242/86.5 A, 86.5 R; 192/0.02 R

[56] References Cited

U.S. PATENT DOCUMENTS

| | | | |
|---|---|---|---|
| 2,795,396 | 6/1957 | Davidson | 255/15 |
| 3,100,626 | 8/1963 | Good | 254/175.5 |
| 3,443,772 | 5/1969 | Prosser | 114/254 X |
| 4,004,780 | 1/1977 | Kuzarou | 254/345 |
| 4,566,674 | 1/1986 | Ebey et al. | 254/345 |

FOREIGN PATENT DOCUMENTS

| | | |
|---|---|---|
| 526862 | 9/1956 | Belgium . |
| 2041317A | 9/1980 | United Kingdom . |

*Primary Examiner*—Sherman Basinger
*Attorney, Agent, or Firm*—Watts, Hoffmann, Fisher & Heinke

[57] ABSTRACT

A power-operated windlass having a motor that reverses direction to control taking in and paying out of a rope and a shifting mechanism responsive to changes in motor direction which selectively locks and unlocks the rope pulley against rotation in an unwinding direction.

3 Claims, 2 Drawing Sheets

FREE FALL WINDLASS

Matter enclosed in heavy brackets [ ] appears in the original patent but forms no part of this reissue specification; matter printed in italics indicates the additions made by reissue.

BACKGROUND OF THE INVENTION

The invention relates to improvements for a windlass, and in particular to a windlass which automatically lowers, locks, or raises an anchor by selective application of power.

Recreational boats, as well as other craft of similar size, represent a large market for a power-operated windlass capable of automatically dropping, locking or raising up an anchor. Ideally, this type of windlass permits free fall of the anchor in one mode of operation and power raising of the anchor in another mode. When the anchor has reached bottom and enough line has been paid out, the windlass, in a simple manner, should be capable of locking up to prevent further extension of the line.

In the recreational boating field and other similar duty applications, an ideal windlass is constructed of components that are few in number, simple in design, inexpensive to produce and assemble, and durable in service. Further, a windlass of good design can be shifted between dropping, locking, and raising action from a remote location without extra manual effort and without the complexity and cost of related servomechanisms and their attendant controls.

SUMMARY OF THE INVENTION

The invention provides a power-operated windlass mechanism that shifts between anchor dropping, locking, and raising modes by a simple reversal in rotary motor direction. The mechanism, in addition to a reversible motor, is embodied with an anti-feed clutch and shifting means for alternatively connecting or disconnecting both the anti-feed clutch and the motor from a rope pulley in response to a change in the direction of rotation of the motor.

The energy of the motor drives the shifting means so that manual effort or auxiliary servo systems are unnecessary to accomplish this task. When the motor is initially operated in a down direction, the rope pulley is disconnected from the anti-feed clutch and the motor, and the anchor is allowed to drop free to the bottom. The mechanism permits the motor to be de-energized after this initial short period of operation in the down direction. Oppositely, initial motor operation in the up direction causes the rope pulley to be connected to both the anti-feed clutch and the motor.

By taking advantage of this characteristic of the mechanism, the rope pulley is locked up simply by running the motor up for a short period sufficient to change the state of the shifting means and energize the anti-feed clutch. The motor is immediately shut off. When it is desired to raise the anchor, the motor is again operated in its up direction until the anchor is at a desired height. The windlass mechanism is ideally suited for remote operation, since all of its functions can be controlled by selectively directing two-way power to the reversible motor.

In the disclosed windlass mechanism, the rope pulley and motor rotate about parallel spaced axii. The shifting mans, which rotates on the motor shaft axis, has the form of a spur gear and is adapted to engage a spur gear rotationally fixed to the rope pulley. A screw thread on the spur gear shifting means causes it to move axially into and out of engagement, depending on the direction of motor rotation, with the rope pulley gear in the manner of a positive contact clutch.

The spur gear shifting means is constantly restrained by a one-way anti-feed clutch from rotation in a direction corresponding to rope feedout. In the preferred embodiment, the one-way clutch is associated with a spur gear rotatable in one direction about an axis parallel to the rotational axis of the shifting means. The spur gears of the shifting means and one-way clutch have sufficient axial tooth length to remain mutually interengaged while the shifting means moves axially in and out of engagement with the rope pulley spur gear. The disclosed windlass construction has few components, is of simple design, and is capable of being mass-produced with limited tooling investment, fabrication costs, and labor. The various operative elements can be readily sized and stressed for high durability without a significant penalty in cost, bulk, or weight.

DESCRIPTION OF THE PREFERRED EMBODIMENT

Figure 1:
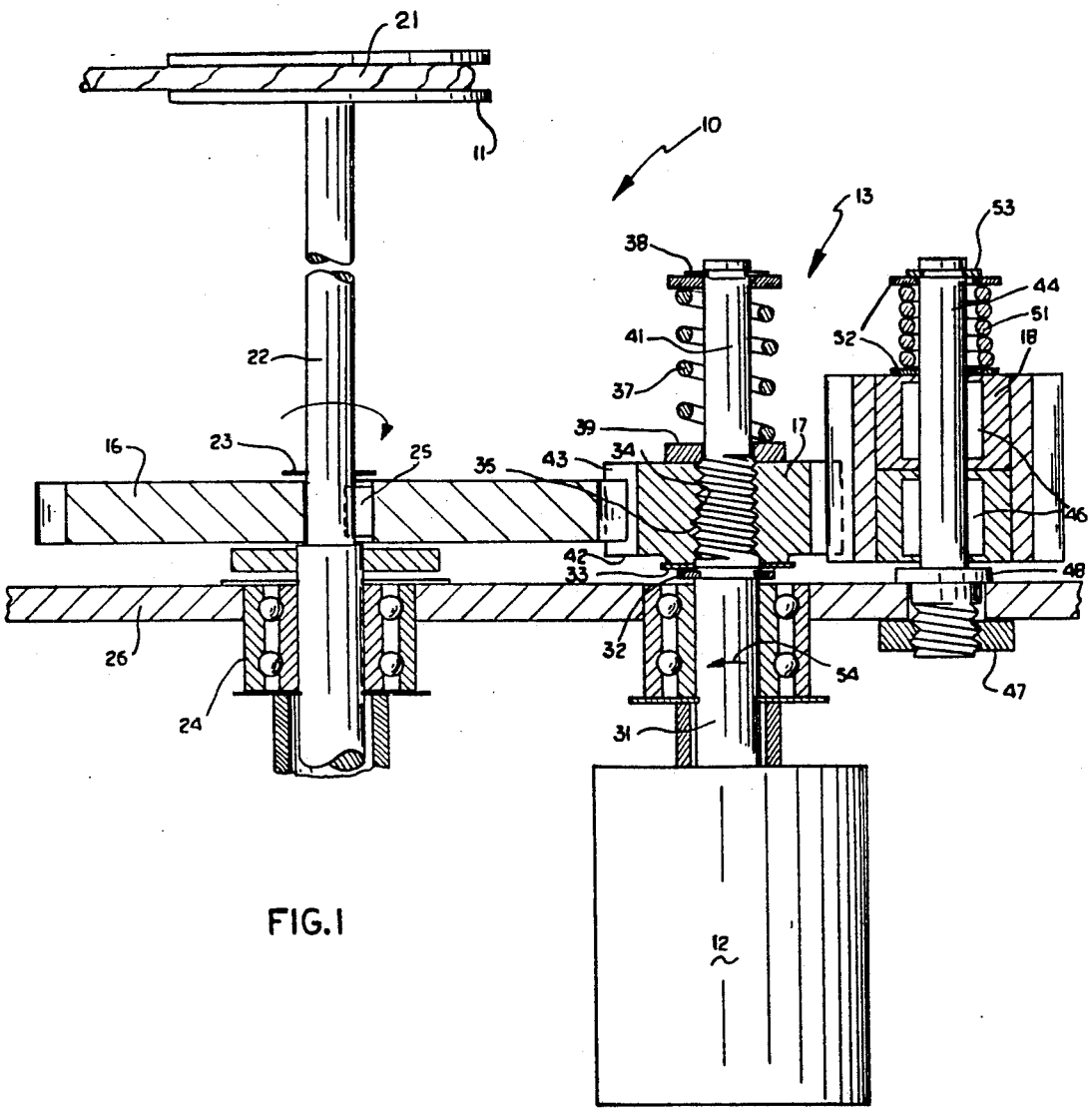
FIG. 1 is a schematic cross-sectional plan view of a windlass, constructed in accordance with the invention, in a locked or anchor raising condition.

Referring now to the drawings, there is shown a windlass 10 including a rope pulley 11, power operated by a rotary motor 12 through a drive system 13. The drive system includes spur gears 16–18.

Rope 21 is taken in or paid out by the pulley 11, depending on its direction of rotation. The spur gear 16 is rotationally and axially locked on a shaft 22 by a suitable keyway or spline 25 and a retaining snap ring 23, respectively. Similarly, the rope pulley 11 is fixed by suitable means to an outboard end of the shaft 22. The inboard end of the shaft 22 is supported in a bearing 24 carried on a fixed wall or base 26 of the windlass 10. The shaft 22 is axially fixed relative to the bearing 24 by suitable means, such as by a press fit therein.

The motor 12 is preferably a reversible electric motor, but other known types of reversible or two-way motors are adaptable to the present invention. the motor 12 includes a shaft 31 on which the spur gear or pinion 17 is assembled. The motor 12 and its associated shaft 31 are suitably axially fixed relative to the wall 26. A snap ring or split washer 32 fitted on a groove on the shaft 31 is abutted by a thrust washer 33 on a side opposite the motor. The spur gear 17 has internal threads 34 in engagement with complementary external threads 35 on the motor shaft 31. By virtue of the threads or helical camming surfaces 34,35, the spur gear 17 is capable of shifting axially on the shaft 31, depending on the direction of rotation of the motor 12 and resultant relative rotation of the gear 17 thereon. The spur gear 17 is resiliently biased in the direction of the motor 12 by a compression spring 37 assembled about the shaft and retained thereon by a snap ring 38 received in a groove on the outboard end of the motor shaft 31. A thrust washer 39 is interposed between the spur gear 17 and spring 37. A portion 41 of the shaft 31 outboard of the threads 35 is sufficiently long to receive the spur gear 17 thereon, as well as a compressed length of the spring 37. The lead edges 42 of the teeth 43 of the spur gear 17 may be beveled or otherwise shaped in a known manner to facilitate proper tooth engagement with the rope pulley gear 16.

The spur gear 18 is supported on a pin 44 by conventional one-way roller clutch members 46. The pin 44 extends through a hole in the wall 26 and is fixed to the wall by a nut 47, which draws an integral shoulder 48 against the wall. The pin 44 has its longitudinal axis parallel to that of the rope pulley shaft 22 and motor shaft 31. The one-way roller clutches 46 support the associated spur gear 18 for rotation in only one rotary direction about the axis of the pin 44. A compression spring 51 assembled on the outboard or free end of the pin 44 is compressed between a pair of thrust washers 52 at each of its ends and is retained on the pin by a split ring 53 received in an annular groove on the pin. The spring 51 operates as a friction brake through the thrust washer 52 on the assembly of the spur gear 18 and one-way clutches 46 to retard this assembly slightly in rotation in the operative direction of the clutches.

The threads 35 on the motor shaft 31 are, for exemplary purposes, left-hand. The motor 12 is most conveniently a reversible electric unit operating, for example, on 12 volts DC. Appropriate electrical cables and a control switch remote from the windlass 10 connect the motor 12 to a source of electrical energy such as a DC battery. The control switch and electrical circuitry are effective to apply the proper polarity and current to the motor to run it in either rotary direction or stop it from running. In the condition illustrated in FIG. 1, the motor 12 has been most recently run in the rotary direction indicated by the arrow 54, i.e., the portion of the motor-driven shaft 31 above the plane of the drawing is moving to the left. This rotary motion, due to the left-hand cut of the motor shaft threads 35, has caused the pinion or control gear 17 to tighten against the thrust washer 33, thereby releasably rotationally locking the gear in a positive connection to the shaft and causing the rope pulley gear 16 to positively rotate in the opposite rotary direction. Such rotation causes an anchor to be raised as rope 21, wound on the pulley 11, is taken in. A pressure bar (not shown) of generally known construction can be provided to prevent the rope from slipping on the pulley 11. The one-way clutches 46, operating through the associated spur gear 18, prevent any counterrotation of the motor shaft spur gear 17 in a direction opposite that indicated by the arrow 54. Thus, by operating the motor 12 in a rotary direction, indicated by the arrow 54, the anchor can be raised to a desired height. When the motor 12 is caused to stop rotation, the one-way or rope anti-feed clutches 46 hold the anchor in position.

Figure 2:
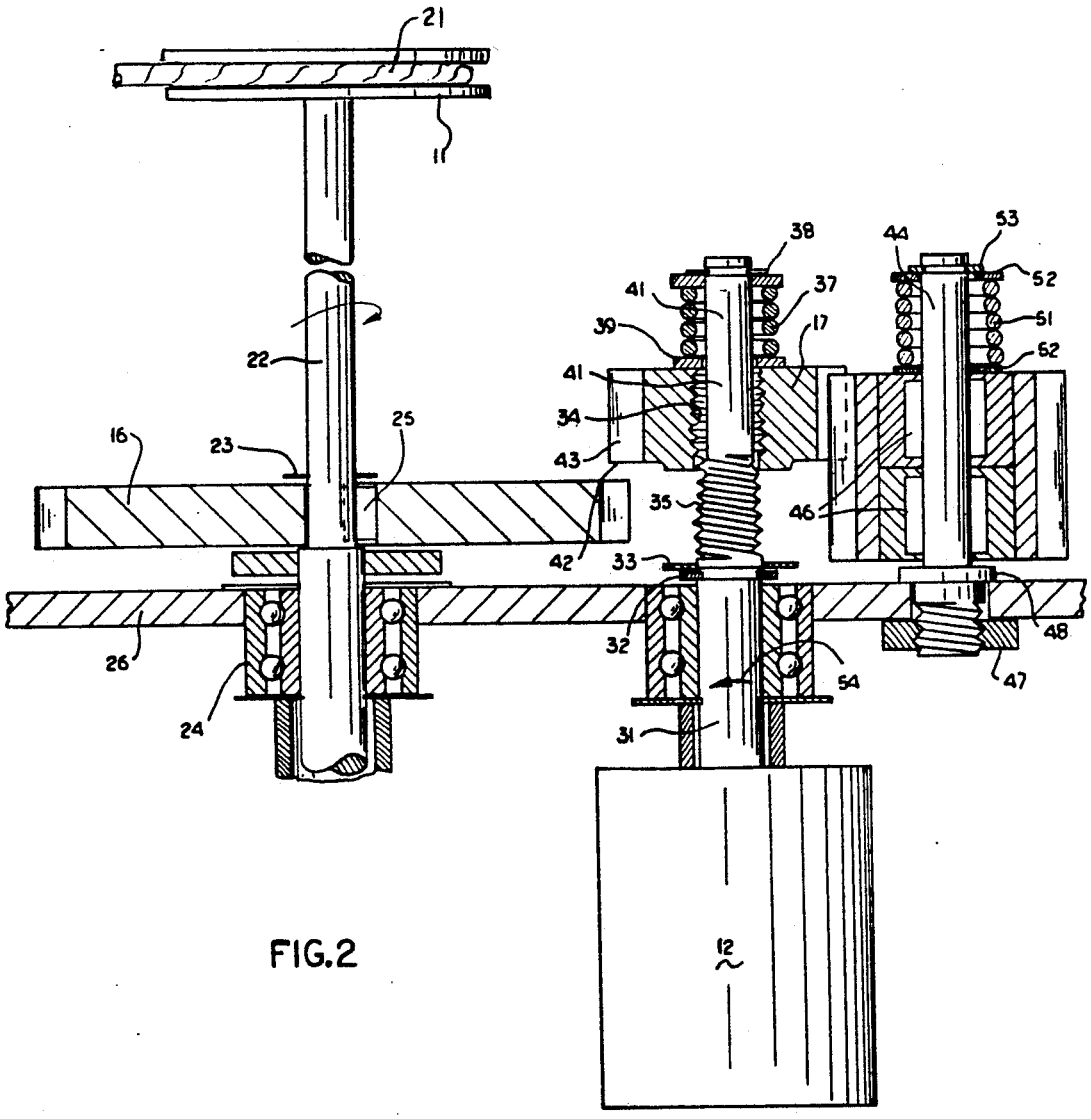
FIG. 2 is a cross-sectional view of the windlass of FIG. 1 in an anchor dropping condition.

When it is desired to drop the anchor, the motor 12 is operated in a rotary direction opposite that of the arrow 54. Initially, this motor shaft rotation causes the spur gear 17 to move axially by forces developed by the mating threads 34, 35. As shown in FIG. 2, eventually the spur gear 17 shifts axially out of engagement with the rope pulley gear 16, at which point the latter gear, as well as the rope pulley 11, is free of restriction against rotation imposed by the one-way or anti-feed clutches 46. Note that, as indicated in FIG. 2, the relative lengths of the gears are such that gears 17 and 18 are still in engagement when gears 16 and 17 are out of engagement. Separation of the threads 34, 35 limits axial movement of pinion 17 away from the gear 16. At this time, the anchor is allowed to drop by gravity and the strand or rope 21 feeds out from the pulley 11. When this shift occurs, the motor operation, if desired, can be discontinued. Regardless of whether or not motor operation in the down direction is continued, the anchor will drop until it reaches bottom. When it is determined that sufficient rope 21 has been let out, the rope pulley 11 can be locked up against further letting out by momentarily operating the motor 12 in the up direction indicated by the arrow 54.

This momentary operation of the motor 12 in the direction of the arrow 54 causes the spur gear 17, under the influence of the compression spring 37 and resistance to rotation imparted by the friction brake spring 51, to shift axially from the non-engaged position indicated in FIG. 2 to that of full engagement with the gear 16 indicated in FIG. 1 in the manner of a positive engagement clutch. As will be understood from the foregoing discussion, once the spur gears 16, 17 are interengaged, the anti-feed gear 18 and associated clutches 46 prevent rotation of the rope pulley shaft 22 in the feed-out direction. Consequently, motor operation can be discontinued and the rope pulley 11 is unable to let out further rope.

It should be evident that this disclosure is by way of example and that various changes may be made by adding, modifying, or eliminating details without departing from the fair scope of the teaching contained in this disclosure. The invention is therefore not limited to particular details of this disclosure except to the extent that the following claims are necessarily so limited.

What is claimed is:

1. A power-operated windlass comprising a motor-driven shaft selectively rotatable in opposite directions, a pulley for feeding out or taking in a strand, means connecting the shaft to the pulley, shifting means movable between first and second positions in response to changes in the direction of rotation of the shaft in a manner wherein it moves from its first position to its second position upon a reversal in rotation of the shaft from a first direction to a second direction and from its second position to its first position upon a reversal in rotation of the shaft from the second direction to the first direction, the shifting means being subjected to positive mechanical forces developed by the motor shaft when caused by the motor shaft to move both from the first position to the second position and from the second position to the first position, the shifting means remaining in its first position until a complete reversal in the direction of rotation of the shaft from the first direction to the second direction is made, *wherein* said shifting means *is engaged with a unidirectionally rotatable spur gear for* preventing said pulley from rotating in a feedout direction when in its first position, *and wherein* the connecting means and shifting means [operating] *operate* to connect the pulley to the shaft to cause the pulley to be positively turned in a strand take-in direction by the shaft when the shaft turns in the first direction and to positively disconnect the pulley from the shaft when the shaft turns in the second direction.

2. A power-operated windlass comprising a pulley for feeding out or taking in a strand, means supporting the pulley for rotation about an axis, a gear rotationally fixed to the pulley, a motor with a shaft rotatable about an axis, a *spur-type* control gear mounted on the motor shaft, means limiting rotation of the control gear to one direction, the control gear being mounted on the motor shaft in a manner which causes it to shift axially thereon between first and second positions in response to changes in direction of rotation of the motor shaft, the control gear being meshed with the pulley gear when in the first position and fully disengaged from the pulley gear when in the second position, the rotation limiting means being effective when said control gear is in the first position to prevent rotation of the pulley in a strand feedout direction, rotation of the motor shaft in one direction initially causing the control gear to assume its first position and subsequently causing the control gear to positively drive the pulley in a direction to take in the strand, rotation of the motor shaft in the opposite direction causing the control gear to assume the second position and release the pulley from restriction by the rotation limiting means.

3. A power-operated windlass comprising a pulley for feeding out or taking in a strand, means supporting the pulley for rotation about an axis, a spur gear rotationally fixed to the pulley, a reversible motor having a shaft rotatable about an axis parallel to the pulley axis, a pinion carried on the motor shaft, the pinion and shaft having interposed helical thread surfaces developing axial movement of the pinion on the shaft during relative rotation therebetween, means limiting axial movement of the pinion on the shaft between first and second positions, the pinion being meshed with the pulley spur gear when in its first position and fully disengaged from the gear when in its second position, an anti-feed gear rotatable in only one direction about an axis parallel to the pulley and motor shaft axii, the pinion being continuously meshed with the anti-feed gear, the anti-feed gear being effective when said pinion is in the first position to prevent rotation of the pulley in a strand feedout direction, the motor shaft, pinion and interengaged threaded surfaces being operable to initially engage the pinion with the pulley gear by movement to the first position and subsequently to rotate the pulley in a direction to take in the strand when the motor shaft turns in a first direction and being operable to disengage the pinion from the pulley ear by movement to the second position when turned in a direction opposite the first direction whereby the pulley is released from restriction of the anti-feed gear.

* * * * *